United States Patent
Keghelian et al.

(10) Patent No.: US 9,097,159 B2
(45) Date of Patent: Aug. 4, 2015

(54) METHOD FOR DETECTING UREA DEPOSITS IN AN EXHAUST LINE OF AN AUTOMOTIVE VEHICLE, METHOD FOR ELIMINATING UREA DEPOSITS AND AUTOMOTIVE VEHICLE ADAPTED TO SUCH METHODS

(75) Inventors: Patrice Keghelian, Lyons (FR); Damien Brunel, Vaulx en Velin (FR)

(73) Assignee: Volvo Trucks AB, Gothenburg (SE)

( * ) Notice: Subject to any disclaimer, the term of this patent is extended or adjusted under 35 U.S.C. 154(b) by 31 days.

(21) Appl. No.: 13/876,905

(22) PCT Filed: Oct. 21, 2010

(86) PCT No.: PCT/IB2010/003044
§ 371 (c)(1),
(2), (4) Date: Mar. 29, 2013

(87) PCT Pub. No.: WO2012/052799
PCT Pub. Date: Apr. 26, 2012

(65) Prior Publication Data
US 2013/0192206 A1    Aug. 1, 2013

(51) Int. Cl.
*F01N 3/00* (2006.01)
*F01N 3/10* (2006.01)
*F01N 3/20* (2006.01)

(52) U.S. Cl.
CPC *F01N 3/10* (2013.01); *F01N 3/208* (2013.01); *F01N 2560/026* (2013.01); *F01N 2560/06* (2013.01); *F01N 2570/14* (2013.01); *F01N 2610/02* (2013.01); *F01N 2610/1493* (2013.01); *F01N 2900/102* (2013.01); *F01N 2900/1402* (2013.01); *Y02T 10/24* (2013.01)

(58) Field of Classification Search
CPC . F01N 3/2066; F01N 3/208; F01N 2560/026; F01N 2560/06; F01N 2610/02; F01N 2610/1493; F01N 2900/102; F01N 2900/1402
USPC ............ 60/274, 276, 285, 286, 295, 301, 303
See application file for complete search history.

(56) References Cited

U.S. PATENT DOCUMENTS

| | | | |
|---|---|---|---|
| 2008/0271440 A1 | 11/2008 | Xu et al. | |
| 2010/0122525 A1 | 5/2010 | Fujita et al. | |
| 2011/0252767 A1* | 10/2011 | Lin et al. | 60/274 |
| 2011/0308233 A1* | 12/2011 | Darr et al. | 60/276 |

FOREIGN PATENT DOCUMENTS

GB    2448993 A    11/2008

OTHER PUBLICATIONS

International Search Report (Jun. 30, 2011) for corresponding International Application PCT/IB2010/003044.

* cited by examiner

*Primary Examiner* — Audrey K Bradley
(74) *Attorney, Agent, or Firm* — WRB-IP LLP

(57) ABSTRACT

A method is provided for detecting urea deposits in an exhaust line of an automotive vehicle and includes determination if an exhaust gas's temperature is reached, if the result of determination is positive, stoppage of urea injection, and determination of the quantity of NOx in the exhaust gases on the outlet of the selective catalytic reduction system. A comparison is performed between the quantity of NOx determined on the outlet of the selective catalytic reduction system and a theoretical quantity or a measured quantity of NOx produced by the internal combustion engine. If the comparison shows that the quantities are different, it is considered that urea deposits are present in the exhaust line. A vehicle is also disclosed.

14 Claims, 3 Drawing Sheets

METHOD FOR DETECTING UREA DEPOSITS IN AN EXHAUST LINE OF AN AUTOMOTIVE VEHICLE, METHOD FOR ELIMINATING UREA DEPOSITS AND AUTOMOTIVE VEHICLE ADAPTED TO SUCH METHODS

BACKGROUND AND SUMMARY

The invention concerns a method for detecting the presence of urea deposits in an exhaust line of an automotive vehicle. The invention also concerns a method for eliminating urea deposits in an exhaust line of a vehicle. The invention also concerns an automotive vehicle adapted to perform such methods.

Because of environmental issues, automotive vehicles such as trucks are often equipped with pollution reduction systems. The aim of some of those systems is to reduce the quantity of Nitrogen oxides (NOx), in the exhaust gases of the vehicles. Reduction of NOx (mostly NO and N02) is often realized with a chemical reaction involving ammonia injected in gas exhaust systems.

As storage and carriage of ammonia in an automotive vehicle is not safe, ammonia can be brought by the injection of urea, or of an aqueous solution thereof, in order for it to decompose into ammonia and react, in a selective catalytic reduction system (SCR), with NOx to produce ideally nitrogen and water.

In order to obtain ammonia from urea, several factors need to be combined, and especially temperature must be high enough for the decomposition reaction to work properly. If the temperature is not high enough, or if other factors are not present, the decomposition reaction may produce solid compounds which may accumulate in the gas exhaust pipes in the form of solid deposits. These solid deposits can obstruct the pipes and induce performance and security issues. For instance, the deposits in the exhaust pipes can reduce the power of the vehicle, or lead to over-pressures in the exhaust line. Those deposits need to be cleaned regularly. In the following, those solid deposits will be referred to as urea deposits although their exact composition may vary and may not comprise only urea, but also intermediate products of the decomposition reaction of urea into ammonia.

It is known that the urea solid deposits can be decomposed to ammonia when exposed to a temperature exceeding a certain threshold, typically around 350° C. Such a reaction will be referred herein as the thermal elimination of the urea solid deposit. Automotive combustion engines produce high temperature exhaust gases, but the temperature of the exhaust gases may vary considerably depending on the engine load. Moreover, temperature of the exhaust gases will inevitably decrease along the exhaust line due to their flowing through various devices such as turbines or particle filters, or simply due to heat exchange between the exhaust line and its environment. Therefore, especially if the SCR system is located downstream in the exhaust line, the potential urea deposits may be exposed to a suitable temperature for their thermal elimination only during a fraction of the operating time of the engine. During that fraction of time, no substantial deposit will be formed, and previously formed deposit will be "naturally" thermally eliminated. On the other hand, outside of that fraction of time, not only urea deposits will not be eliminated, but further deposit may be formed.

Various techniques are known to "artificially" enhance the exhaust gas temperatures of an engine, for example by modifying the engine operating conditions or by heating the exhaust gases with a heating device. Unfortunately, these techniques all have in common an increased energy consumption, and particularly a fuel over-consumption. Known methods execute a forced thermal elimination of the urea deposits by artificially increasing the exhaust gases temperature at regular intervals, and for a predetermined period of time, irrespective of whether urea deposits have formed in the exhaust line, and irrespective of the amount of deposit to be eliminated. For instance, such methods initiate a predefined forced thermal elimination period each time a given distance has been covered by the vehicle since the last forced elimination.

In order to avoid a fuel over-consumption, some methods detect urea deposits in the exhaust pipes and initiate the regeneration reaction only when needed. It is known, for instance from US-A-200810271440, to measure pressure variations in exhaust pipes and/or SCR system to detect urea deposits. Results given by this solution lack precision and are difficult to exploit.

Thus, known techniques of detection do not permit to precisely conclude about presence or not of urea deposits in exhaust pipes at a given time.

This invention aims, according to an aspect thereof, at proposing a new method for detecting and eliminating urea deposits in an exhaust line of an automotive vehicle, which permits to determine precisely if urea deposits are present in exhaust pipes, in order to begin the cleaning of the pipes only when needed, and to stop it when the cleaning is finished.

To this end, an aspect of the invention concerns a method for detecting urea deposits in an exhaust line of an automotive vehicle, equipped with an internal combustion engine, a selective catalytic reduction system, mounted on the exhaust line, adapted to convert NOx produced by the internal combustion engine, and an injection system adapted to inject urea in the exhaust line, upstream the selective catalytic reduction system. This method is characterized in that it comprises the following steps:

a) determination if an exhaust gases temperature is reached, b) if the result of determination made at step a) is positive, stoppage of urea injection, c) determination of the quantity of NOx in the exhaust gases on the outlet of the selective catalytic reduction system, d) comparison between the quantity of NOx determined at step c) and a theoretical quantity or a measured quantity of NOx produced by the internal combustion engine, e) if step d) shows that said quantities are different, considering that urea deposits are present in the exhaust line.

Thanks to an aspect of the invention, urea deposits in the exhaust pipes are detected by the difference between the quantity of NOx downstream the internal combustion engine and downstream the selective catalyst reduction system. In fact, regeneration reaction of urea deposits is used to detect presence of deposits. The precision of this detection permits to start a cleaning procedure only when needed, avoiding fuel over-consumption in the case cleaning is done by burning deposits.

According to further aspects of the invention which are advantageous but not compulsory, such a method can include the following features:

The theoretical quantity of NOx produced by the internal combustion engine is determined on the basis of the operating conditions of said internal combustion engine.

The quantity of NOx produced by the internal combustion engine is determined through the use of a sensor in an exhaust pipe of said exhaust line upstream of said selective catalytic reduction system.

The method is initiated only if a given distance has been covered and/or a given time period has elapsed since the last detection of presence of urea deposits.

The quantity of NOx determined at step c) is a mean value computed over a given period of time.

A given quantity of ammonia or ammonia precursor is stored, prior to step b) in a portion of the selective catalytic reduction system, then the quantity of NOx is determined at step c) after release of the given quantity of ammonia or ammonia precursor in the selective catalytic reduction system.

The method comprises, prior to step a), a further step of:

f) altering the operating conditions of the internal combustion engine or otherwise heating the exhaust gases to raise the exhaust gases temperature.

At step d), comparison is made by comparing a NOx conversion rate value (Rm) to a minimum threshold.

The invention also concerns, according to an aspect thereof, a method for eliminating urea deposits in an exhaust line of an automotive vehicle, said method implementing the aforementioned method for detecting urea deposits. This method also comprises a step of:

f) if at step e) one can consider that urea deposits are present in the exhaust line, cleaning of the exhaust line.

According to further aspects of the invention which are advantageous but not compulsory, such a method for eliminating urea deposits may incorporate one or several of the following features:

The detection method is performed during the cleaning of the exhaust line.

If at step e) one cannot consider that urea deposits are present in the exhaust line, the cleaning of the exhaust line is stopped and the urea injection system is reactivated.

The invention also concerns an automotive vehicle with which the above-mentioned method can be implemented. More precisely, the invention concerns an automotive vehicle equipped with a selective catalytic reduction system mounted on an exhaust line of the vehicle and adapted to convert NOx produced by an internal combustion engine of the vehicle, an injection system adapted to inject urea in the exhaust line, upstream the selective catalytic reduction system, a NOx sensor mounted in the exhaust line, downstream the selective catalytic reduction system, and an exhaust gases temperature sensor upstream the selective catalytic reduction system. This vehicle is characterized in that it comprises also means adapted to stop operation of the urea injection system, to compare a quantity of NOx measured by the NOx sensor to a theoretical NOx quantity or a measured NOx quantity produced by the internal combustion engine, and to perform cleaning of the exhaust line on the basis of the result of the comparison between said quantities.

According to further aspects of the invention which are advantageous but not compulsory, such a vehicle may include the following features:

The means to stop operation of the urea injection system, the means to compare and the means to perform cleaning are included in an electronic control unit.

The electronic control unit is adapted to compute a theoretical value of the quantity of NOx produced by the internal combustion engine, on the basis of the operating conditions of the engine.

The electronic control unit is adapted to control the operating conditions of the internal combustion engine.

The vehicle comprises means to store ammonia or an ammonia precursor in the selective catalytic reduction system.

BRIEF DESCRIPTION OF THE DRAWINGS

The invention will now be explained in correspondence with the annexed figures and as an illustrative example, without restricting the object of the invention. In the annexed figures.

DETAILED DESCRIPTION

Figure 1:
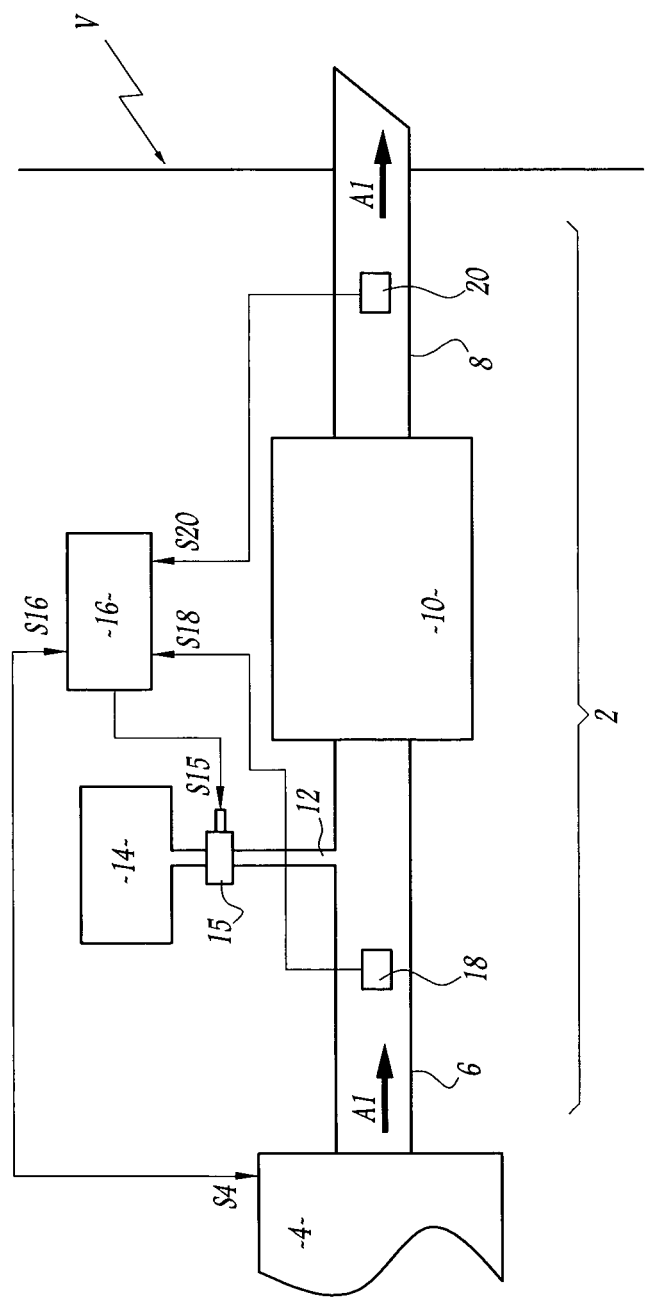
FIG. 1 is a schematic representation of a gas exhaust line of a vehicle according to the invention.
Figure 2:
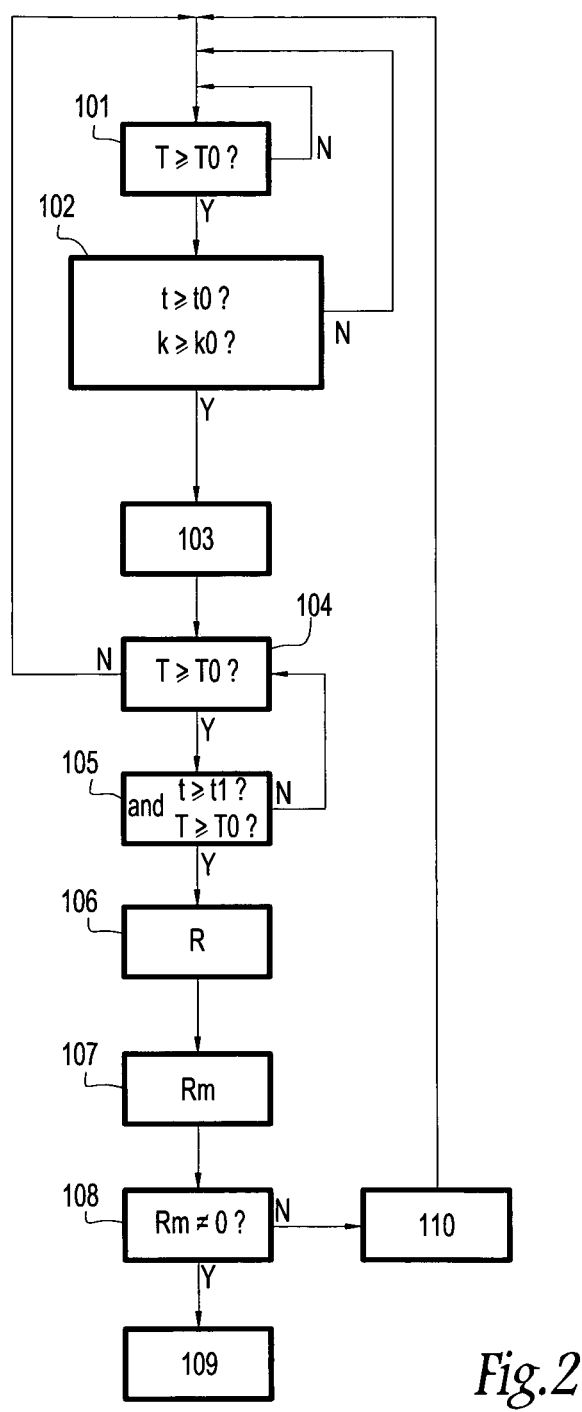
FIG. 2 is a block diagram representing a method according to the invention.

An automotive vehicle V, such as a truck, is equipped with a gas exhaust line 2, which evacuates exhaust gases produced by an internal combustion engine 4 of vehicle V. Exhaust line 2 comprises two pipes 6 and 8, which are schematically represented on FIG. 1. The structure of the connection of exhaust line 2 with internal combustion engine 4 is here simplified for the comprehension of the drawings.

A selective catalytic reduction (SCR) system 10 is inserted between pipe 6 and pipe 8. Pipe 6 is connected to internal combustion engine 4. Exhaust gases rejected by internal combustion engine 4 flow through exhaust line 2 along arrow A1. In reference to the flow direction of exhaust gases with respect to SCR system 10 pipe 6 is named upstream pipe and pipe 8 is named downstream pipe.

A urea injection pipe 12 is connected to upstream pipe 6. Pipe 12 connects a area tank 14 to upstream pipe 6. A solenoid valve 15 controls flow of urea from tank 14 into pipe 12. Urea is usually stored and injected in the form of an aqueous solution of urea. It must be noted that further devices might be found on exhaust line 2, such as, for instance, the turbine of a turbocharger, a Diesel particulate filet, or a muffler. A typical arrangement can comprise successively a turbine, a particulate filter, the area injection pipe, the SCR system and the muffler, in that order.

Vehicle V comprises one or several electronic control units or ECU 16, which control the operation of exhaust line 2, and which regulate the operation of urea control valve 15 thanks to an electrical signal S15.

Electronic control unit 16 can communicate with internal combustion engine 4 and with other control units. More particularly, unit 16 can receive information about the operating conditions of the vehicle, such as its gear, its engine speed and its fuel consumption, thanks to an electronic signal S16. Moreover, electronic control unit 16 can influence the operating conditions of internal combustion engine 4 thanks to an electronic signal S4.

In the shown example, exhaust line 2 comprises two sensors, each being adapted to send, directly or indirectly, information to electronic control unit 16. A temperature sensor 18 located in upstream pipe 6 is adapted to determine the temperature of exhaust gases flowing in upstream pipe 6. Preferably, the temperature sensor 18 is located not too far away in the exhaust line from where urea deposits are expected to occur, i.e. generally just downstream of urea injection pipe 18. This temperature information is sent to electronic control unit 16 as an electronic signal S18. In an alternative solution, temperature sensor 18 could be replaced by an estimation of the temperature of exhaust gases. For example, such temperature may be estimated by the engine control based on the operating parameters of the engine. Other factors can be taken into account such as the ambient temperature around the vehicle.

A sensor 20 located in downstream pipe 8 determines directly or indirectly the quantity of NOx in exhaust gases flowing in downstream pipe 8, and sends this information to electronic control unit 16 as an electronic signal S20. The term "quantity" should be here and hereafter understood in a vide sense. For example, it can be a concentration measured in a given gas volume, or a flow value or any other parameter representative of the amount of NOx in the exhaust line.

NOx sensor 20 can be for example a double lambda sensor, or any other means adapted to measure or estimate, directly or indirectly, the quantity of NOx in a gas volume.

SCR system 10 is adapted to reduce the quantity of NOx in exhaust gases by provoking a chemical reaction between NOx and ammonia brought in exhaust line 2 by urea injected through pipe 12. Urea injected in upstream pipe 6 reacts and decomposes in isocyanic acid (HNCO) and ammonia ($NH_3$) as described in the following reaction:

$$NH_2\text{—}CO\text{—}NH_2(\text{urea}) \rightarrow HNCO + NH_3 \quad (R1)$$

As urea injected in exhaust line 2 is in the form of an aqueous solution, isocyanic acid (HNCO) reacts with water to produce ammonia ($NH_3$) and carbon dioxid, as shown in the following reaction:

$$HNCO + H_2O \rightarrow NH_3 + CO_2 \quad (R2)$$

As decomposition reaction R2 of isocyanic acid with water is a slow reaction, isocyanic acid reacts also with urea to form biuret, as shown in the following reaction:

$$NH_2\text{—}CO\text{—}NH_2 + HNCO \rightarrow \text{biuret} \quad (R3)$$

This R3 reaction can also produce ammelide and water, as shown in the following reaction:

$$2NHCO + NH_2\text{—}CO\text{—}NH_2 \rightarrow \text{ammelide} + 2H_2O \quad (R4)$$

Isocyanic acid can also decompose into cyanuric acid, as shown in the following reaction:

$$3NCO \rightarrow H_3N_3C_3O_3 \quad (R5)$$

Biuret, ammelide and cyanuric acid are among the urea deposits that can appear in exhaust line 2, downstream urea injection pipe 12. They can either appear in upstream pipe 6 or in SCR system 10.

In SCR system 10, NOx react with ammonia to produce nitrogen and water, as shown in the following reaction $$NOx + NH_3 \rightarrow N_2 + H_2O$$

This reaction is named "conversion reaction".

The urea deposits detection method of the invention uses the thermal elimination reaction which produces ammonia from urea deposits. To start the detection method, temperature T of exhaust vases upstream SCR system 10 should be superior to a temperature value of, for example, 350° C., since the thermal elimination of urea deposits occurs mainly above this temperature. On the basis of this value of 350° C. one considers a threshold temperature value T0 which can be equal to 350° C.

In a first step 101 of the method, temperature in the exhaust line is measured or estimated. For example, temperature sensor 18 measures exhaust gases temperature upstream pipe 6 and sends the temperature value to electronic control unit 16 thanks to signal S18. Each measurement is done at a regular time interval, which can be, for instance, 50 ms. In case temperature T is superior to temperature T0, another step 102 of the method is implemented. If T is inferior to T0, the detection method cannot be implemented. It must be noted that if the vehicle operating conditions are not such that temperature T is "naturally" over threshold temperature T0, then it is possible to overcome this fact b forcing the elevation of exhaust gases temperature T by known techniques.

In step 102, one determines the time t spent or the distance k covered by vehicle V since the last detection of presence of urea deposits in the exhaust line 2. Various experiments permit to determine that urea deposits are likely to appear after a given period of time t0 of use of vehicle V or after a given number k0 of kilometers covered. If such a period of time t0 or distance k0 covered has not been reached, there is little risk for urea deposits to have appeared and it is therefore not useful to go on executing the detection method. The threshold values t0, k0 can be fixed, or can be variable as a function of past and/or present vehicle operation conditions. For example, it is known that vehicles operating in cold environments, or operating often at low engine loads will be more prone to the formation of urea deposits and could be subject to more frequent analysis of the presence or not of such deposits. Thus, if distance k0 and/or time period t0 have not been reached, the method goes back to step 101. This step of waiting for a predefined time interval I before performing the detection method is optional. For example, the detection method could be performed each time the engine operating conditions bring temperature T in the exhaust line over threshold T0.

In another embodiment, the determination made at step 102 may be optionally executed before step 101. In that case, reaching distance k0 and/or time t0 may be considered as a condition for initiating the detection method.

If time to and/or distance k0 have been reached, urea deposits may have appeared. Therefore, another step 103 of the method is implemented. In this step 103, urea injection is stopped, thanks to electronic signal S15 transmitted to urea control valve 15 by electronic control unit 16. Stoppage of urea injection should stop conversion reaction of NOx into nitrogen in SCR system 10.

After step 103, as temperature T of exhaust gases is still measured by sensor 18, one can verify if temperature T is still superior to temperature T0, in a step 104. If temperature T is superior to temperature T0, urea injection stoppage is maintained. If temperature has become inferior to temperature T0, the method goes back to step 101. Step 104 is executed until a measuring time t1 is reached. Time t1 is the time period during which a temperature measurement can permit to conclude on the fact that internal combustion engine 4 is or is not in an operating period leading to a high exhaust gases temperature. In a further step 105, one determines if temperature T has been superior to temperature T0 until measuring time t1 has been reached. If time t1 has not been reached under this conditions, the method goes hack to step 104.

If temperature T is still superior to temperature T0 and measuring time t1 has elapsed, another step 106 of the method is implemented with NOx sensor 20. In this step 106, NOx sensor 20 measures the quantity Q20 of NOx in exhaust gases in downstream pipe 8, on the outlet of SCR system 10, in order to determine which quantity Qc of NOx has been converted into nitrogen in SCR system 10. On the basis of this measurement, a NOx conversion rate R, which is the value of the quantity Qc of NOx converted in SCR system 10, with respect to the theoretical quantity Q4 of NOx produced by internal combustion engine 4, is computed. Theoretical NOx quantity Q4 is computed by electronic control unit 16 on the basis of the information transmitted by electronic signal S16, including engine rotation speed, gear and other information. This theoretical quantity Q4 of NOx computation is known by those skilled in the art.

The quantity Qc of NOx that is converted into nitrogen is determined by deducting the quantity Q20 of NOx measured by NOx sensor 20 from the theoretical quantity Q4 of NOx produced by internal combustion engine 4, as $$QC = Q4 - Q20.$$

Thus, conversion ratio can be expressed as:

$$R = \frac{QC}{Q4} = 1 - \frac{Q20}{Q4}$$

Determination of conversion rate R can be executed each time a measurement of NOx quantity Q20 is done. This means control unit 16 computes a given number of conversion rate values R over a period of time t2.

In a further step 107 of the method, a mean value Rm of conversion rate R over a period of time t2 may be computed.

The time period during which mean conversion rate Rm is determined is sliding. In other words, the value Rm computed is permanently based on NOx quantity values determined at a given time.

Each time a new NOx quantity is measured, a new conversion rate is computed and the values on which mean conversion rate Rm is computed are offset. As a consequence, the first value of time period t2 is no more taken into account after the end of this time period. It permits to compute permanently conversion rate Rm, also during the execution of a cleaning procedure.

In another step 108 of the method, mean conversion rate value Rm is compared to a theoretical conversion rate value R0 which equals:

$$R0 = Q20T/Q4$$

where Q20T is the theoretical quantity of NOx in exhaust gases.

Theoretically, as urea injection is stopped, no NOx should be converted into nitrogen SCR system 10. Therefore, theoretical value Q20T of NOx in exhaust gases is zero and theoretical conversion rate R0 is null. If it is determined that mean conversion rate Rm is different from zero, one can consider that some ammonia is still present in upstream pipe 6 or in SCR system 10, despite the urea injection has been stopped. This ammonia can only come from the thermal elimination of urea deposits.

Figure 3:
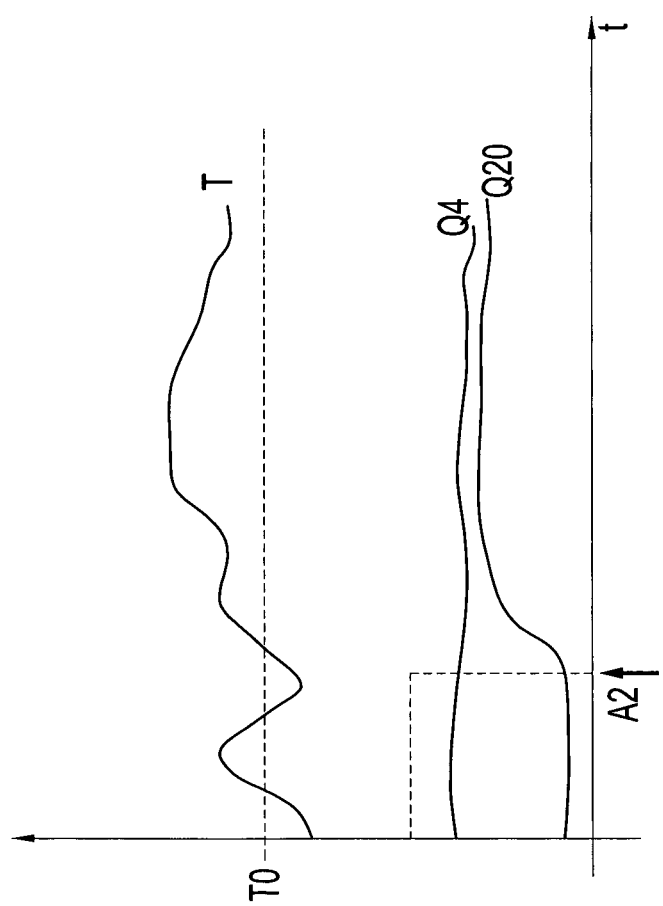
FIG. 3 is a time versus exhaust gases temperature and NOx quantity chart, describing the implementation of the method according to the invention.

As shown on FIG. 3, urea injection is stopped once it is determined than temperature T is sustainably superior to temperature T0. From this point, shown by arrow A2, the comparison between the quantity Q4 of NOx on the outlet of internal combustion engine 4 and the quantity Q20 of NOx measured by sensor 20 permits to conclude on the presence or not of urea deposits. As shown on the chart of FIG. 3, the fact that the curves of Q4 and Q20 are not superimposed shows the presence of urea deposits.

If mean conversion rate Rm is superior to theoretical conversion rate value zero by a certain margin, for example 0.2, taking into account measurements and/or estimation uncertainties, it can be determined that some urea deposits are present in the exhaust line and are being thermally eliminated. If such urea deposits are detected by the method, then it can be decided to continue with a cleaning procedure of exhaust line 2 in a step 109. The cleaning procedure is in fact the continuation of the detection procedure, tinder the same operating condition, especially with the exhaust temperature over threshold T0 and with the urea injection stopped.

In case mean conversion rate value Rm equals zero or is inferior to a certain threshold, such as 0.2, taking into account measurements and/or calculations uncertainty, one can consider that its value is zero. In other words, quantities Q20 and Q4 are considered as equal. Then, one can conclude that no urea deposit is present in exhaust line 2 or not anymore. In that case, urea injection is re-started in a step 110 and the method goes back to step 101.

As for the detection method, the cleaning procedure executed at step 109 can be done in different ways. It may benefit from the "naturally" high temperatures due to the vehicle operating conditions, or may initiate forced enhanced temperatures through known techniques. For example, operating conditions of internal combustion engine 4 can be altered in order to keep exhaust gases temperature T superior to temperature T0, in order to continue thermal elimination of urea deposits in exhaust line 2. Alternatively, a special device like a burner, not represented on figures, which operates using fuel of vehicle V may be used to enhance the temperature in the exhaust line.

Cleaning of urea deposits can also be realized by combining it with a cleaning operation of a diesel particulate filter (DPF), not represented on the figures. As the DPF becomes periodically overfilled with particulates, it has to be cleaned by a heating of exhaust gases, in order to "burn" particulates. To save fuel or more generally energy, destruction of particulates in the filter can be combined with cleaning of urea deposits, the heating of the exhaust gases, and therefore the energy needed, being used for two different cleaning operations.

During this cleaning operation, it is advantageous to continue comparing the flow of NOx at the output of the system compared to the flow of NOx at the input of the system, as provided by the detection method of the invention. Indeed, if mean conversion rate Rm is back to a value which indicates that no more urea deposits are present in exhaust line 2, cleaning step 109 and regeneration of urea deposits can be automatically stopped. Injection of urea is then reactivated. This means that it is advantageous to keep the detection method running in parallel during the cleaning procedure. This of course allows limiting the amount of NOx which would exit the exhaust line. Also, if the cleaning procedure is performed while it is necessary to "artificially" enhance the exhaust gas temperature, terminating the procedure as soon as the urea deposits have been sufficiently eliminated will save energy because the exhaust temperatures will no longer need to be enhanced.

According to a non-represented alternative embodiment of the invention, the quantity Q'4 of NOx actually produced by internal combustion engine 4 can also be determined by a NOx sensor placed in upstream exhaust pipe 6, preferably in the vicinity of internal combustion engine 4 to permit a precise measurement of the quantity of NOx that flows in the exhaust gases. In that case, the computation of NOx conversion rates R and Rm uses this quantity Q'4 instead of computing theoretical NOx quantity Q4.

In another embodiment which is not represented in the figures, SCR system 10 may comprise ammonia or ammonia precursor storage unit adapted to deliver ammonia for a known time period after the stoppage of urea injection. For example, a ceramic kernel of a SCR catalyst system can be able to store ammonia in gaseous form when excess ammonia is introduced in the SCR system. In that case, NOx quantity measurements are executed and presence or absence of urea deposits is determined after the end of this time period.

The invention claimed is:

1. An automotive vehicle comprising:
   a selective catalytic reduction system mounted on an exhaust line of the vehicle and adapted to convert NOx produced by an internal combustion engine of the vehicle,
   an injection system adapted to inject urea in the exhaust line, upstream of the selective catalytic reduction system,
   a NOx sensor mounted in the exhaust line, downstream of the selective catalytic reduction system,
   an exhaust gas's temperature sensor upstream of the selective catalytic reduction system, and
   at least an electronic control unit adapted to stop operation of the urea injection system, to compare a quantity of NOx measured by the NOx sensor to a theoretical NOx quantity or a measured NOx quantity produced by the internal combustion engine, and to perform cleaning of the exhaust line on the basis of the result of the comparison between the quantities.

2. A vehicle according to claim 1, comprising a ceramic kernel to store ammonia or an ammonia precursor in the selective catalytic reduction system.

3. A vehicle according to claim 1, wherein the electronic control unit is adapted to compute a theoretical value of the quantity of NOx produced by the internal combustion engine, on the basis of operating conditions of the engine.

4. A vehicle according to claim 3, wherein the electronic control unit is adapted to control the operating conditions of the internal combustion engine.

5. A method for detecting urea deposits in an exhaust line of an automotive vehicle, equipped with:
   an internal combustion engine,
   a selective catalytic reduction system, mounted on the exhaust line, adapted to convert NOx produced by the internal combustion engine,
   an injection system adapted to inject urea in the exhaust line, upstream of the selective catalytic reduction system,
   wherein the method comprises the following steps:
   a) determination if an exhaust gas's temperature is reached using a temperature sensor,
   b) if the result of determination made at step a) is positive, stoppage of urea injection,
   c) determination, using a NOx sensor, of a quantity of NOx in the exhaust gases on the outlet of the selective catalytic reduction system,
   d) comparison between the quantity of NOx determined at step c) and a theoretical quantity or a measured quantity of NOx produced by the internal combustion engine,
   e) if step d) shows that the quantities are different, determining that urea deposits are present in the exhaust line, and
   f) initiating cleaning of the exhaust line by operating the internal combustion engine or by operating a burner to heat exhaust gas in response to a determination at step e) that urea deposits are present in the exhaust line.

6. A method according to claim 5, wherein the theoretical quantity of NOx produced by the internal combustion engine is determined on the basis of operating conditions of the internal combustion engine.

7. A method according to claim 5, wherein the NOx sensor is located in an exhaust pipe of the exhaust line downstream of the selective catalytic reduction system.

8. A method according to claim 5, wherein the method is initiated only if a given distance has been covered and/or a given time period has elapsed since the last detection of presence of urea deposits.

9. A method according to claim 5, wherein the quantity of NOx determined at step c) is a mean value computed over a given period of time.

10. A method according to claim 5, wherein a given quantity of ammonia or ammonia precursor is stored, prior to step b) in a portion of the selective catalytic reduction system, and wherein the quantity of NOx is determined at step c) after release of the given quantity of ammonia or ammonia precursor in the selective catalytic reduction system.

11. A method according to claim 5, wherein the method comprises, prior to step a), a further step of:
   f) altering operating conditions of the internal combustion engine, or otherwise heating the exhaust gases to raise the exhaust gases temperature.

12. A method according to claim 5, wherein at step d), comparison is made by comparing a NOx conversion rate value to a minimum threshold.

13. A method according to claim 5, wherein the detection method is performed during the cleaning of the exhaust line.

14. A method according to claim 13, wherein if due to performing the cleaning operation, the quantity of NOx in the exhaust gases on the outlet of the selective catalytic reduction system becomes equal to a theoretical quantity or to a measured quantity of NOx produced by the internal combustion engine, the cleaning of the exhaust line is stopped and the urea injection system is no longer stopped.

* * * * *

UNITED STATES PATENT AND TRADEMARK OFFICE
CERTIFICATE OF CORRECTION

| | | |
|---|---|---|
| PATENT NO. | : 9,097,159 B2 | Page 1 of 1 |
| APPLICATION NO. | : 13/876905 | |
| DATED | : August 4, 2015 | |
| INVENTOR(S) | : Patrice Keghelian | |

It is certified that error appears in the above-identified patent and that said Letters Patent is hereby corrected as shown below:

Title Page, Item (75) Inventors:

Change the spelling of the city for inventor Patrice Keghelian from "Lyons" to --Lyon--.

Signed and Sealed this
Twelfth Day of January, 2016

Michelle K. Lee
*Director of the United States Patent and Trademark Office*